May 22, 1934.  V. A. SCHOENBERG  1,960,224
TENSION MEASURING DEVICE
Filed June 2, 1933
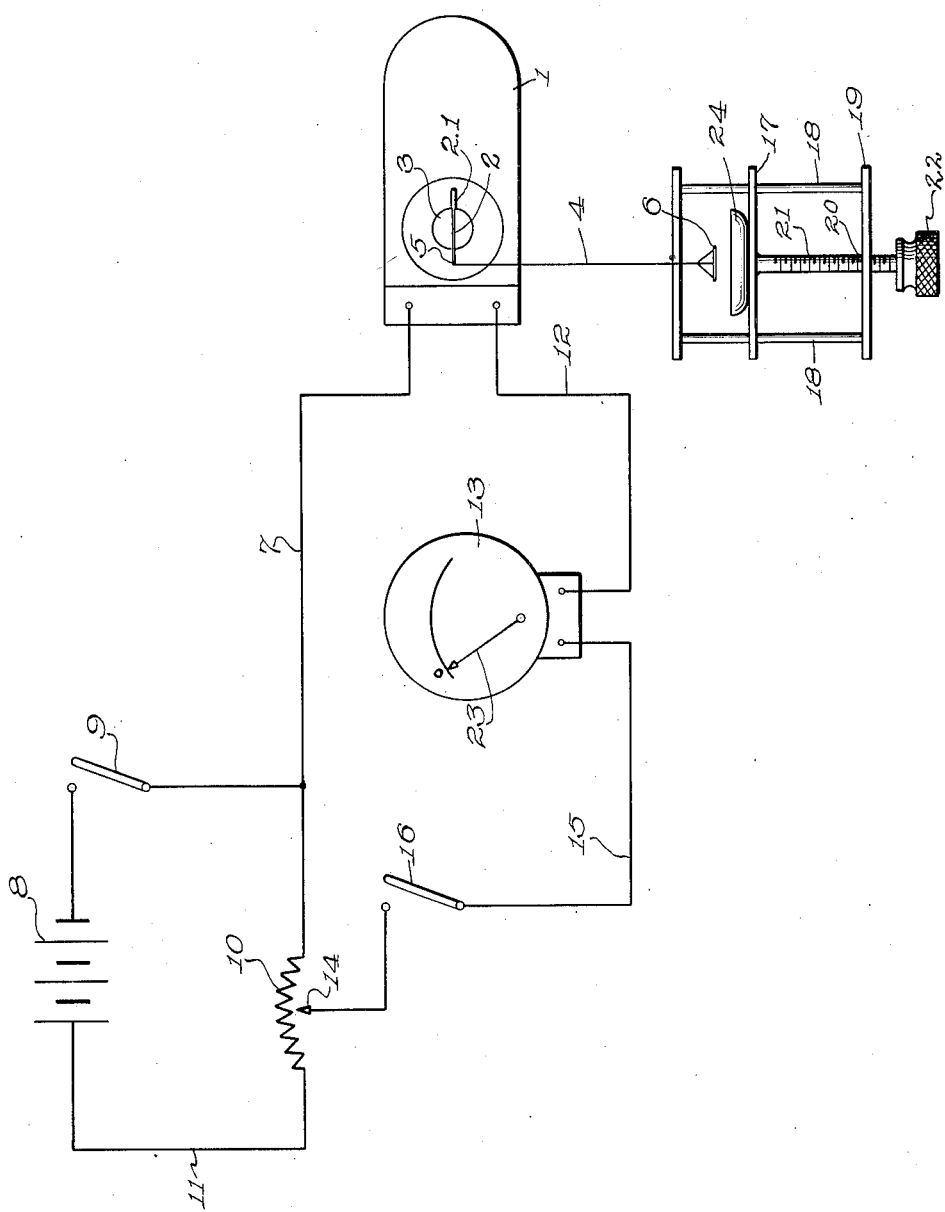
Inventor
Virgil A. Schoenberg.
Witness
Arthur M. Franke.
Rummler Rummler & Woodworth
Attys.

Patented May 22, 1934

1,960,224

UNITED STATES PATENT OFFICE 1,960,224

TENSION MEASURING DEVICE

Virgil A. Schoenberg, Niles Center, Ill.

Application June 2, 1933, Serial No. 674,017

4 Claims. (Cl. 73—51)

This invention relates to improvements in means for determining the film or surface tension of liquids.

The main objects of this invention are to provide a device for determining the surface tension of liquids by electrical means; to provide a device of this character having a torque device of special design; to provide means for controlling the torque device; to provide indicating means to read degrees of surface tension of liquids; and to provide a device of the character described which is simple in construction and operation and inexpensive to manufacture.

An illustrative embodiment of this invention is shown in the accompanying drawing in which the figure shown is a diagrammatic sketch showing one means for carrying out the present invention.

Referring in detail to the drawing, a torque device 1 of special design and construction is provided having an outwardly extending torque arm 2 which is positioned at right angles to the armature shaft 3 and connected thereto. A suitable wire or cord 4 is attached adjacent one end of the torque arm 2 as at 5, and extends downwardly therefrom. A small ring-shaped wire loop 6 is attached to the lower end of the wire 4, and the torque arm is then mechanically balanced to remain in a horizontal plane by adjusting a small weight 2.1 which is slidably mounted thereupon.

One terminal of the torque device 1 is connected by lead wire 7 to any suitable source of current 8 which may be dry cell batteries, etc., through switch 9, and to one side of the resistance 10. The other side of the resistance is connected to the other side of the battery 8 by lead 11. The second terminal of the torque device 1 is connected by the lead 12 to one terminal of the calibrated current meter 13. The other terminal of the current meter 13 is connected by lead wire 15 through switch 16 to a shiftable contact arm 14 coacting with the resistance 10.

An adjustable support comprises a tray 17 slidably mounted on guides 18 and is provided with a base 19. A threaded aperture 20 arranged in the medial portion of the base 19 is adapted to receive the tap bolt 21. The lower medial portion of the tray 17 rides on one end of the bolt 21 and the other end of the bolt 21 is provided with a knurled handle 22.

In operation, the switches are closed and the potentiometer comprising the resistance 10 and the contact arm 14, is adjusted to its "zero" position so that the indicator 23 on the current meter 13 will read "zero". In this position there is no current passing through the current meter or the torque device, and the surface tension loop is then at its balanced position. A sample of the liquid to be tested is then placed in a small dished plate 24 and placed on the tray, directly below the surface tension loop. The tray is then elevated by turning the tap bolt until the surface of the liquid in the dish 24 contacts with the loop 6. The contact arm 14 is then advanced along the resistance 10, allowing the current to flow through the circuit, thereby causing the torque device to gradually raise the torque arm which in turn raises the loop through wire 4. The loop draws a film of liquid upwardly when it is raised. The contact arm 14 is steadily advanced until the film breaks, and at that point the advancing of the contact arm is stopped and the amount of electrical power needed to break the film is then read on the current meter.

By means of the hereindescribed device, the total amount of electrical energy required to break the film of liquid under test is indicated on the meter 13 which, when calibrated through tests with mediums having known surface tension characteristics provides a rapid and accurate means for determining the tension characteristics of any unknown medium.

The hereindescribed device may also be used to determine the specific gravity of liquids. In such a case the contact member may be first submerged in the liquid being tested and then balanced so that the torque arm is in a horizontal position by means of the shiftable weight 2.1. The cup 24 holding the liquid under test is then lowered until the contact member is withdrawn from the liquid. With the weight hanging free from the liquid, the torque arm 2 will be unbalanced and will rest in a vertical position. Electrical energy is then applied to the torque device, in the same manner as described for surface tension tests, until the torque arm is drawn to a balanced or horizontal position, at which point the total energy required to restore the balance of the torque arm 2 can be read directly from the meter 13.

Although but one specific embodiment of this invention is herein shown and described, it is to be understood that details of the construction shown may be altered or omitted without departing from the spirit of this invention as defined by the following claims.

I claim:

1. An instrument for testing the surface tension of liquids, comprising an electrical torque producing element, a liquid contact member connected to said element, a vessel adapted to contain liquid to be contacted by said contact member, means for relatively moving said member and vessel towards and from one another, and means for indicating the energy absorbed by said torque producing element to overcome the surface tension of the liquid under test.

2. An instrument for testing the surface tension of liquids, comprising an electrical torque producing element, a liquid contact member connected to said element, a vessel adapted to contain liquid to be contacted by said contact member, means for adjusting the position of said vessel relative to said contact member, a resistance control for said torque element, and means for indicating the energy required to overcome the surface tension of the liquid under test.

3. An instrument for testing the surface tension of liquids, comprising an electrical torque producing element, a liquid contact member connected to said element, a vessel adapted to contain liquid to be contacted by said contact member, means for adjusting the position of said vessel relative to said contact member, a potentiometer control for said torque element, and means for indicating the energy required to overcome the surface tension of the liquid under test.

4. An instrument for testing the surface tension of liquids, comprising an electrical torque producing element, a liquid contact member connected to said element, a vessel adapted to contain liquid to be contacted by said contact member, means for adjusting the position of said vessel relative to said contact member, a potentiometer control for said torque element, and a meter for indicating the torque required to overcome the surface tension.

VIRGIL A. SCHOENBERG.